United States Patent [19]

Bell et al.

[11] 4,136,458
[45] Jan. 30, 1979

[54] BI-AXIAL PROBE

[75] Inventors: Frederick K. Bell, Centerville; Jerome E. Deis, Kettering; Paul E. Allen, Springfield, all of Ohio

[73] Assignee: The Bendix Corporation, Southfield, Mich.

[21] Appl. No.: 728,573

[22] Filed: Oct. 1, 1976

[51] Int. Cl.² .............................................. G01B 7/00
[52] U.S. Cl. ................................ 33/174 L; 33/143 L; 33/147 N; 33/148 H; 33/172 E
[58] Field of Search ............ 33/169 R, 174 L, 172 E, 33/149 J, 148 H, 143 L, 23 K, 174 R, 174 P, 174 Q, 147 N, 172 R

[56] References Cited

U.S. PATENT DOCUMENTS

| | | | |
|---|---|---|---|
| 3,016,619 | 1/1962 | Mueller | 33/172 R |
| 3,212,325 | 10/1965 | Katz et al. | 33/147 N |
| 3,520,063 | 7/1970 | Rethwish et al. | 33/174 L |
| 3,670,420 | 6/1972 | Kiewicz | 33/169 B |
| 3,673,695 | 7/1972 | Rethwish et al. | 33/174 L |

Primary Examiner—Richard E. Aegerter
Assistant Examiner—Willis Little
Attorney, Agent, or Firm—Kenneth A. Seaman; Raymond J. Eifler

[57] ABSTRACT

A probe for measuring coordinate positions on an object by sensing a displacement of the stylus which contacts the object. The probe is responsive to forces which result from the contact between the object and the stylus to indicate coordinate positions of the object. The probe includes a replaceable stylus having a shank portion defining an axis, with a transversely-extending portion extending from the shank portion for sensing forces exerted by objects in the axial direction away from the probe, while the stylus shank portion is responsive to forces in the radial and axial (toward the probe) directions. The probe is thus responsive to forces exerted on the stylus in any direction.

18 Claims, 8 Drawing Figures

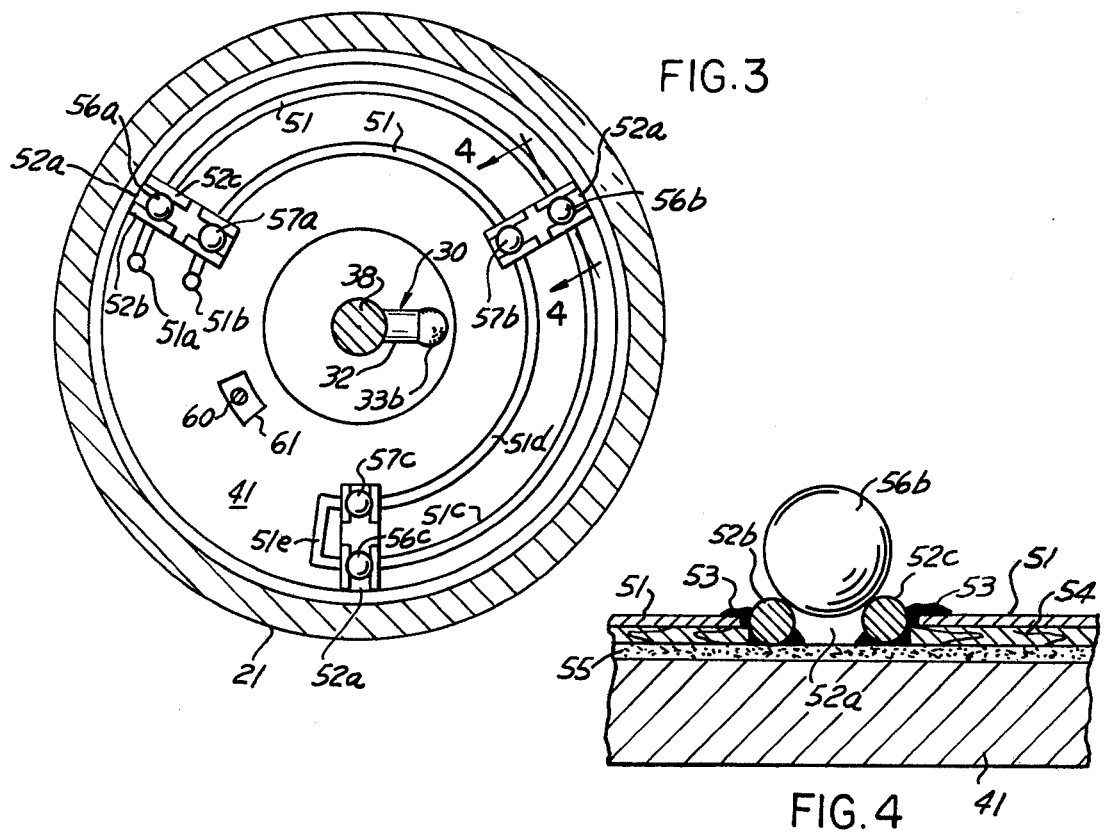
FIG. 3
FIG. 4
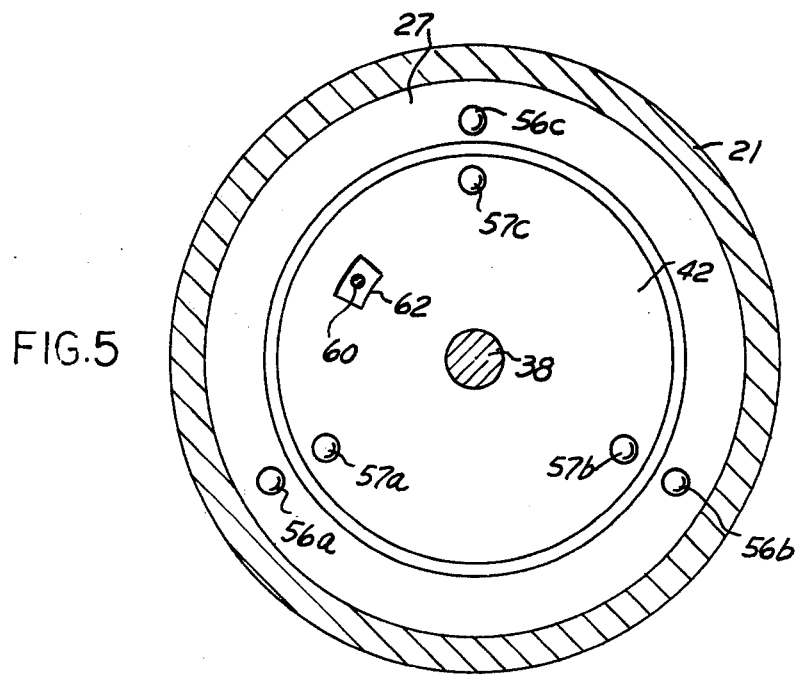
FIG. 5

BI-AXIAL PROBE

BACKGROUND OF THE INVENTION

1. Field of the Invention

This invention relates to a probe for sensing stylus tip movement for measuring coordinate positions. This invention is more particularly related to an improved probe which responds to forces in radial directions and both axial directions and can therefore measure positions and sense forces while moving in an axial direction either toward or away from the probe.

2. Description of the Prior Art

The probes of the prior art such as German Patent application Publication 2.347,633 No. responded to radial forces, but only axial forces directed toward the probe -- that is, could only sense forces directed toward the probe in the axial direction, and could not sense the forces in an axial direction directed away from the probe.

Coordinate measuring machines which used the prior art probes could respond to objects located in an axial direction of the probe only when the probe was being moved toward the object. These measuring machines lacked the ability to use the return stroke (moving the probe back), to measure in the axial direction. These prior art probes were also unable to gage on the back side of objects or indicate coordinate positions in blind locations on the interior of the object.

SUMMARY OF THE INVENTION

This invention overcomes the foregoing limitations in the prior art by providing a probe which is responsive to forces in both axial directions as well as in the radial directions.

The invention is a probe which is characterized by an axially-extending stylus shank (31) carrying a bent or transversely-extending stylus end-portion (32) for engaging objects and sensing forces directed away from the probe along the probe axis. A hardened ball (33b) for engaging the object is located at the intersection of the shank (31) and the transverse end-portion (32) and a second hardened ball (33a) is located at the distal end of the transverse end-portion (32). This invention is further characterized by two sets of low-resistance electrical contacts (56a, 56b, 56c and 57a, 57b, 57c) disposed within the housing for making an electrical circuit (51) carried within the housing relatively low-resistance when no external forces are present, and increasingly by several orders of magnitude the electrical circuit resistance when an external force in a radial or either axial direction is sensed.

In one embodiment of the invention, two plates (41,42) are carried on the stylus housing (21,22) and are each urged into contact by a pair of springs (43,44) disposed within the housing. One plate (41) carries a circuit (51) with spaced interruptions (52a) of insulator regions disposed along the length of the circuit between two terminals (51a, 51b). The second plate (42) and the housing (21) each carry a plurality of conducting elements such as metal balls (56a, 56b, 56c and 57a, 57b, 57c) disposed to bridge the insulator regions on the circuit when no external forces are applied to the stylus, When each insulator region is bridged by a conductor element, the circuit is complete and the resistance between the two terminals is low. External forces acting along either axial direction of the stylus or radially along the stylus, cause at least one of the conducting elements to move away from the circuit and no longer bridge the insulator region in a low-resistance manner. The circuit in that area becomes more resistive and raises the resistance of the electric circuit between the two terminals by several orders of magnitude.

Accordingly, it is an object of this invention to provide a probe which is responsive to forces in a radial or either axial direction.

It is another object of this invention to provide a stylus for a probe which engages forces directed axially relative to the stylus and away from the probe.

The foregoing and other objects and features of this invention will become apparent from the following detailed description taken in conjunction with the accompanying drawings and claims which form a part of this specification. The specific structure disclosed in the detailed description is exemplary and for the purpose of understanding only, as the invention is not to be understood as limited to the specific structure shown.

BRIEF DESCRIPTION OF THE DRAWINGS

FIG. 3 is a view looking down along line 3—3 in FIG. 2, showing one embodiment of a conductor plate carried in the probe;

FIG. 4 is a cross-sectional view taken along line 4—4 in FIG. 3 showing a cross-section of the conductor plate;

FIG. 5 is a view as shown by the line 5—5 in FIG. 2 showing a second plate in the interior of the probe;

DETAILED DESCRIPTION OF THE DRAWINGS

Figure 1:
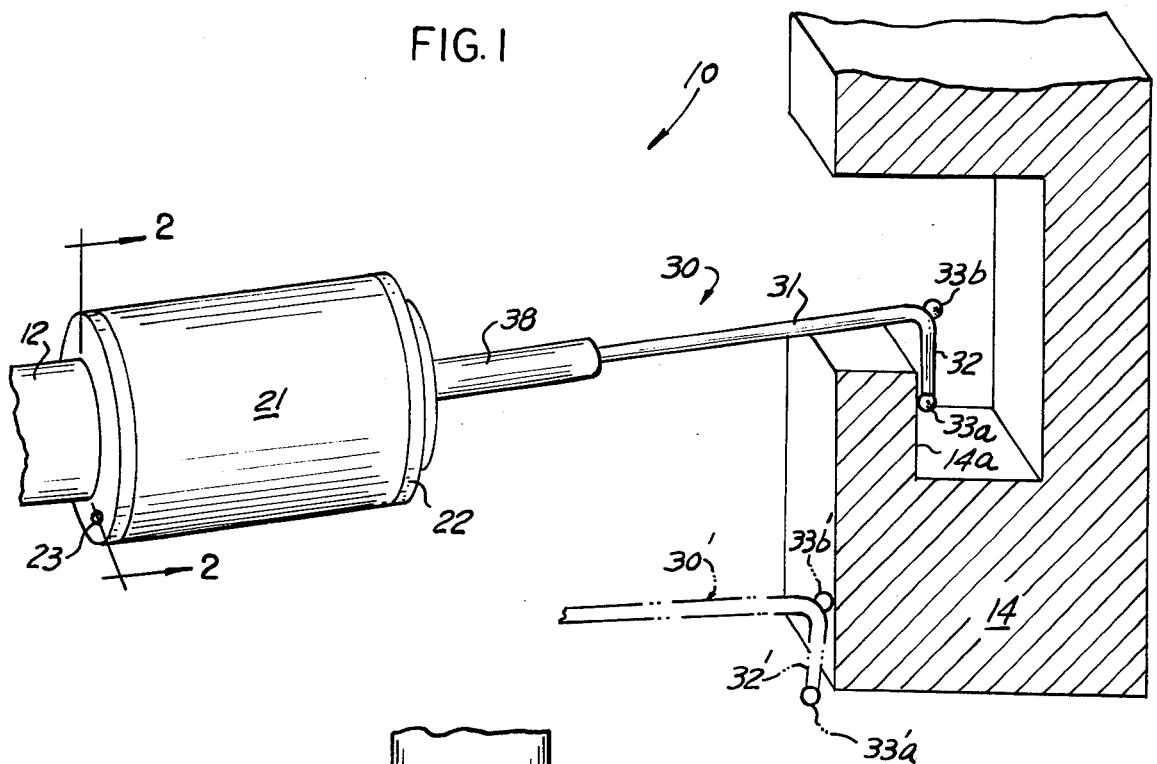
FIG. 1 is a perspective view showing the probe of this invention.

Referring now to the drawings, FIG. 1 illustrates a probe 10 of this invention. The probe 10 consists generally of a housing 21, 22 and a stylus assembly 30, extending from the housing. The probe 10 is generally cylindrical and carried on the end of a measuring arm 12 as part of a coordinate measuring machine, with only part of the measuring arm shown in FIG. 1. The measuring arm 12 is movable in a selectable orientation and velocity so as to know the position of the stylus 30 at any time. The probe 10, as part of the coordinate measuring machine, advantageously inspects an object 14 by engaging the object 14 with the stylus assembly 30 for measuring the coordinates of the object 14 by responding to displacement of the stylus 30 by the object 14.

As shown, the stylus assembly 30 carries two hardened balls 33a, 33b. The first ball 33a is disposed to engage the object 14 when the force on the probe 10 is directed axially away from the probe 10, as when an inside surface 14a of the object is inspected. The second ball 33b' is disposed to engage the object 14 for responding to an axial force toward the probe, as the stylus 30', shown in phanton, demonstrates. In this latter position, the first ball 33a' does not engage the object. Radial forces may be sensed by either of the balls 33a, 33b.

Figure 2:
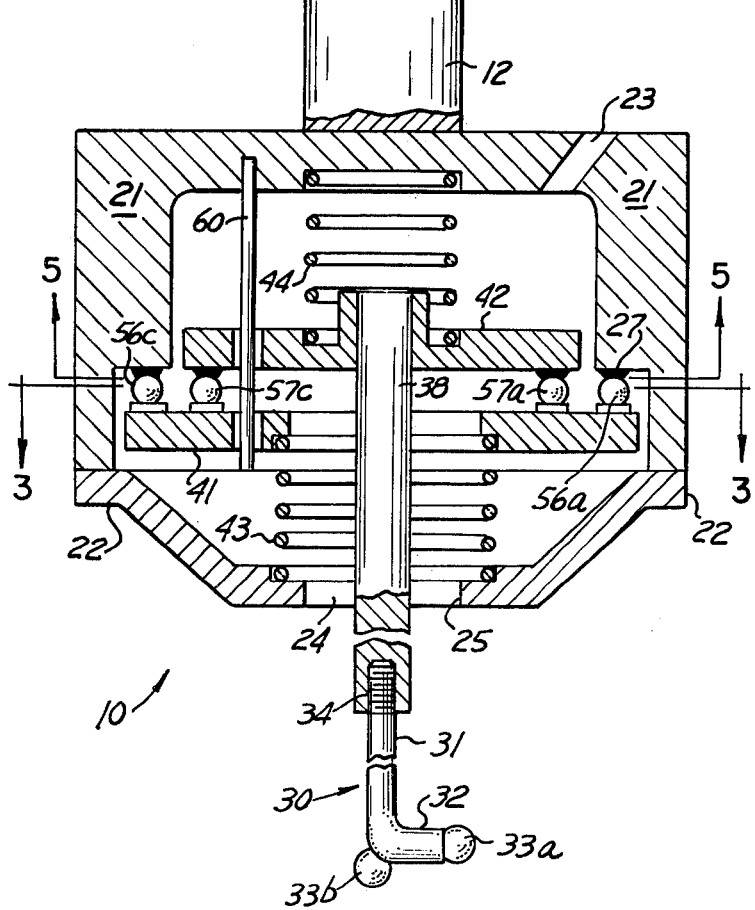
FIG. 2 is a cross-sectional view of the probe shown in FIG. 1, viewed along line 2—2 in FIG. 1 showing the interior structure of the probe.

Referring now to FIG. 2, the interior structure of the probe 10 is shown. The probe 10 consists of internal mechanical structure and internal circuitry, as well as the housing 21, 22 and the stylus 30.

The housing 21, 22 further consists of an upper housing 21 and a lower housing 22. The upper housing 21 and the lower housing 22 are joined by screws (not shown) after the internal mechanical structure and circuitry of the unit have been assembled. A cable hole 23 is formed in the upper housing so that an electrical cable (not shown) can be inserted.

The lower housing 22 has a circular opening 25 which is covered by a seal 24. The seal 24 is mounted around the stylus assembly 30 and protects the interior structure of the probe 10 from external contaminants. The seal 24 is made from a yieldable material, such as polyurethane, a rubber or plastic, to allow the stylus assembly 30 to move relative to the lower housing 22.

The stylus assembly 30 consists of a shank portion 31 extending axially from the probe 10 and a transverse portion (or hook) 32. The transverse portion 32 is located near one end of the shank portion 31, advantageously approximately perpendicular to the shank portion 31 and of relatively short length. The portion 32 may be formed by bending the end of the shank portion 31 until a right angle is formed. The transverse portion 32 carries the ball 33a as an engagement tip for sensing objects or forces. The second ball 33b is located near the junction of the shank portion 31 and the transverse portion 32. The balls 33a, 33b are made of a hardened material, such as carbide steel, which will not degrade during operation and are held in place in a suitable manner, such as by brazing to the stylus portion. The other end of the shank portion 31 carries a threaded projection 34 for removably coupling the stylus to a stylus holder 38 carried by the probe 10. Coupling of the stylus 30 to the probe 10 by the threaded projection 34 allows a second stylus to be easily interchanged for a first stylus.

The interior mechanical structure of the probe consists of a first and second plate 41, 42 each of generally a disc shape with a medial opening. The stylus holder 38 is carried in the medial openings of first and second plates 41, 42 and includes a threaded socket for receiving the threaded projection 34 of the stylus 30. First and second springs 43, 44 bias the first and second plates 41, 42 into contact with each other with a preload on the springs 43, 44. The first spring 43 also biases the first plate 41 toward an annular flange 27 of the housing 21.

The internal circuitry carried by the probe 10 is shown in detail in FIGS. 3–5. FIGS. 3 and 4 show the detail of one embodiment of the circuitry carried on the first plate 41, and FIG. 5 shows an arrangement of the circuit elements on the second plate 42.

In FIG. 3, the first plate 41 carries a printed circuit 51 defining a current path between two terminals 51a, 51b which terminals may be attached to a cable (not shown) in operation, with the cable in turn connected to an external sensing or triggering circuit (also not shown). Such a sensing circuit is responsive to the resistance of the printed circuit 51, and more particularly, to the change in resistance from a low level to a high level. As is shown in FIG. 3, the printed circuit 51 is preferably in the form of two concentric circular arc portions 51c, 51d with the respective ends opposite the cable connected together by a conductive portion 51e.

Disposed along the arc of the printed circuit circular portion 51c, 51d are interrupted portions 52a. These interrupted portions 52a are disposed along the arcs of the circular printed circuits 51c, 51d at selected spaced intervals, preferably located to provide a spacing along the arcs of 120° between successive interruptions. Located at each spaced interruption is a pair of steel rods 52b, 52c. These steel rods 52b, 52c are connected with conducting epoxy 53 to the printed circuit 51 to provide a good electrically conducting contact between the printed circuit 51 and the steel rods 52b, 52c.

Two sets of steel balls, an outer set 56a, 56b, 56c and an inner set 57a, 57b, 57c are disposed to bridge the spaced interruptions 52a in the printed circuit 51 to electrically complete the circuit and minimize the resistance between the terminals 51a, 51b. The outer set of balls 56a, 56b, 56c are carried on the flange 27 of the upper housing 21 and the inner set 57a, 57b, 57c are carried on the second plate 42.

The balls in the first and second sets are advantageously a carbide steel, hardened to resist wear and provide a good electrical contact with the steel rods 52b, 52c.

As shown in FIG. 4, the printed circuit 51 is carried on a printed circuit board 54. The printed circuit board 54 is cemented to an insulator material 55, and the insulator material 55 is cemented to the plate 41.

The steel ball 56b is adapted and positioned to rest on the steel rods 52b, 52c and thereby bridge the spaced interruption 52a in the printed circuit 51. A complete electrical circuit exists when the ball 56b is firmly seated on the steel rods 52b, 52c from one side of the printed circuit 51 through the conducting epoxy 53, thence through the steel rod 52b, the steel ball 56b, the steel rod 52c, the conducting epoxy 53 and the other side of the printed circuit 51. The insulator material 55 insulates this current path from the plate 41, which may be advantageously metallic, such as aluminum, or alternatively steel.

FIG. 5 shows the location of the inner set of balls 57a, 57b, 57c on the second plate 42. These steel balls are firmly connected to the plate 42 by a nonconducting material, such as nonconducting epoxy, allowing the plate 42 to be a metallic material, such as aluminum. The balls 57a, 57b, 57c are disposed a uniform distance from the center of the plate 42 and are spaced at an angular displacement of 120° one from the other. This arrangement provides for the inner set of balls to engage the inner arc 51d of the printed circuit 51 at the spaced interruptions 52a.

The outer set of balls 56a, 56b, 56c are carried on the annular flange 27 of the upper housing 21 in a similar manner and arrangement. The axial arrangement of the two plates to the housing is important to allow the inner set of balls and the outer set of balls to seat properly in the spaced interruptions 52a in the printed circuit 51. The steel rods 52b, 52c provide a guide for the individual balls such as 56b, which do not exactly align radially. So long as the lower portion of the balls 56b falls between the rod 52c, the spring force biasing the balls 56b toward the plate 41 will urge the ball toward engagement of both steel rods 52b, 52c. The probe 10 must be assembled with the arrangement of the balls adapted to the arrangement of the spaced interruptions 52a in the printed circuit 51. A rod 60 is affixed to the upper housing 21 and extends downwardly parallel to the axis of the probe 10 and the housing 21. The rod 60 engages the first plate 41 through a slot 61 cut through the plate 41. The slot 62 is cut through the second plate 42 and also engages the rod 60. The slots 61, 62 are each arcuate allowing the first and second plates 41, 42 to rotate a small number of degrees before the rod 60 stops the rotation. The rod 60 also serves to limit the translation of the plates 41, 42 with respect to the axis of the probe 10.

Referring again to FIG. 2, it will be seen that spring 43 urges plate 41 into engagement with the outer set of balls 56a, 56b and 56c while spring 44 urges plate 42 downward so that the inner set of balls 57a, 57b, 57c are seated on the plate 41.

Having described the structure of one embodiment of the probe 10 with some particularity, the operation of the probe will be detailed for a clearer understanding of the invention. An upward force on the ball 33b carried by the stylus 30 causes the plate 42 to move upward and away from the lower housing 22 (in FIG. 2). The plate 41 is unable to move upward with the plate 42, since the outer set of balls 56a, 56b, 56c are rigidly mounted to the flange 27 carried on the upper housing 21 and do not yield upwardly. The relative movement of the plate 42 away from the plate 41 causes the inner set of balls 57a, 57b, 57c to move away from the steel rods 52b, 52c, thereby interrupting the printed circuit 51 and making a high resistance between the ends 51a, 51b of the printed circuit 51.

A downward force on the ball 33a causes the plate 42 to move downward. The downward motion of plate 42 is translated to a downward motion of plate 41 through the inner set of balls 57a, 57b, 57c mounted to plate 42 and initially in contact with plate 41. The downward motion of plate 41 causes the printed circuit 51 and the steel rods 52b, 52c carried thereon to move down relative to the stationary upper housing 21 and the outer set of balls 56a, 56b, 56c carried on the upper housing 21. The relative movement of plate 41 away from the outer set of balls 56a, 56b, 56c causes a high resistance between the ends 51a, 51b of the printed circuit 51.

A force in the radial direction relative to the stylus shank 31 causes a high resistance between the terminals 51a, 51b of the printed circuit 51 by moving at least one of the plates 41, 42 in a pivoting motion. Depending on the preload of the springs 43, 44 and the direction of the radial force, the radial force either causes the plate 42 to pivot on at least one of the inner set of balls 57a, 57b, 57c on the stationary plate 41, or causes both plates 41, 42 to pivot one at least one of the outer set of balls 56a, 56b, 56c. In any case, at least one of the other balls in the set including the pivotal ball displaces from its firm seating position to cause a high resistance.

Conventional electrical apparatus responsive to relative resistance levels are coupled to the ends of the printed circuit 51a, 51b for indicating whether a force is being exerted on the stylus balls when no force is sensed, the resistance is relatively low, that is, in tens or hundreds of ohms, advantageously less than two hundred ohms. The electrical apparatus is responsive to the transition between these two resistive levels to indicate the presence of a stylus displacement.

Figure 6:
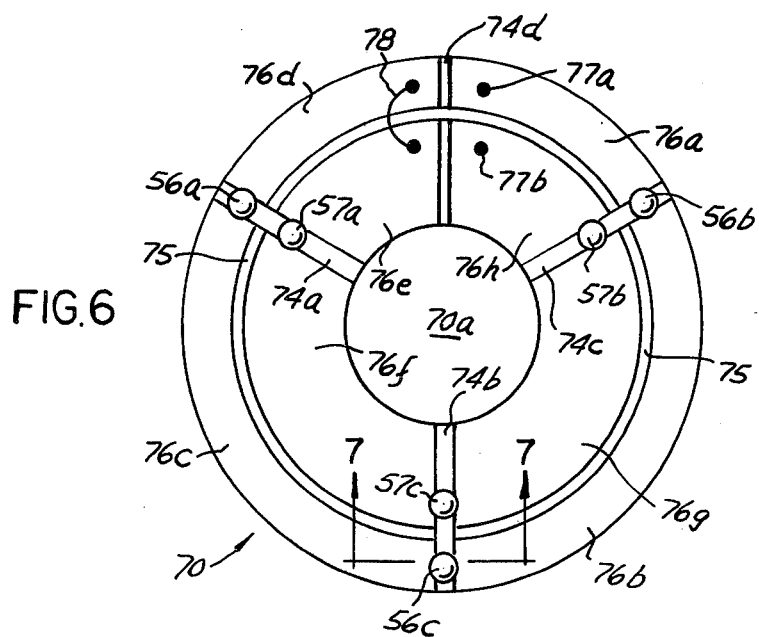
FIG. 6 is an alternate embodiment of the conductor plate shown in FIG. 3.
Figure 7:
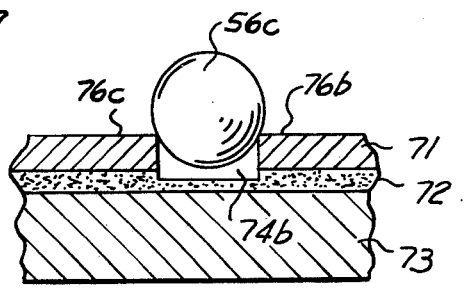
FIG. 7 is a cross-sectional view taken along the line 7—7 in FIG. 6 showing a cross-section of the alternate conductor plate.

FIG. 6 and 7 show an alternate embodiment for the plate 41 of FIG. 3 and 4 which carries electric conductor. FIG. 6 is a top view of the alternate embodiment showing a conducting plate 70. A cross-sectional view, FIG. 7, shows the sandwich-style construction of this plate, wherein a conducting layer 71 is disposed above an insulating material 72, both of which are carried on a plate 73, which is preferably a strong and durable material, such as aluminum.

The plate 70 has a medial opening 70a through which the stylus holder 38 passes. A channel 74 is cut completely through the conductor 71 to form spokes 74a, 74b, 74c extending outwardly of the medial opening 70a. Each spoke 74a, 74b, 74c is located at an angular displacement of approximately 120° from the adjacent spoke to provide for a uniform response to radial forces. An additional spoke 74d extends from the medial opening 70a between the spokes 74a, 74c. An annular channel 75 is formed medially between the medial opening 70a and the outer circumference of the plate 70. This channel 75 is cut completely through the conducting layer 71 and into the insulating layer 72.

The annular channel 75 and the radial spokes 74a, 74b, 74c, 74d combine to divide the conducting layer 71 into eight conducting regions, each which is initially isolated electrically from the other. These eight regions include four outer regions 76a, 76b, 76c, 76d and four interior regions 76e, 76f, 76g, 76h. Electric terminals 77a, 77b are provided on the conducting regions 76a, 76h respectively. A jumper wire 78 connects the conducting region 76d, 76e. The outer set of contacting balls 57a, 57b, 57c are shown in their position to bridge the nonconductive spokes. Thus, when no external force is present on the stylus, the first and second sets of conductive balls are in position to bridge the nonconductive regions and a completed circuit path between terminals 77a and 77b is present as follows: Through conductive region 76a, conducting ball 56b, conductive region 76b, conductive ball 56c, conductive region 76c, conductive ball 56a, conductive region 76d, jumper 78, conductive region 76e, conductive ball 57a, conductive region 76f, conductive ball 57c, conductive region 76g, conductive ball 57b, and region 76h.

Each of the conductive balls accordingly are seated in contact with two conductive regions to bridge a nonconductive region. Thus, ball 56c is seated on the conductor regions 76b, 76c to bridge nonconductive region 74b.

The movement of any conductive ball away from the seated position on the conductor on either side will result in the resistance between terminals 77a, 77b becoming greatly increased. An appropriate sensing circuit connected to the terminals 77a, 77b and responsive to changes in the resistance between the terminals 77a, 77b will indicate whether or not all of the conducting balls are properly seated, and thereby indicate whether or not the stylus has been displaced.

Figure 8:
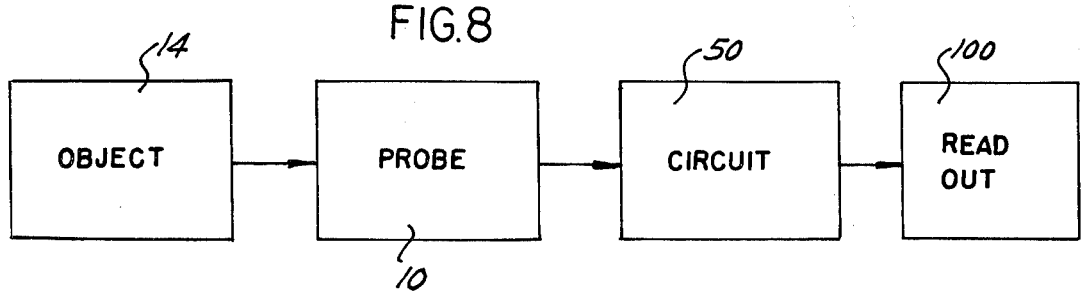
FIG. 8 shows in block diagram a coordinate measuring system for using the probe of this invention.

As shown in FIG. 8, a block diagram of a coordinate measuring system of this invention is shown. A probe 10 is responsive to an object 14 to detect forces applied between the object 14 and the probe 10. The circuit 50 is electrically responsive to the change in resistance of probe in response to forces applied between the probe 10 and the object 14. When a force between the probe 10 and the object 14 is detected, the circuit 50 changes state, and a readout 100 is responsive to the state of the circuit 50. For example, the readout 100 may latch upon the state change of circuit 50 for the storage of instantaneous coordinate positions of the probe 10.

It will be appreciated that the probe is responsive to objects in one of two ways: A stationary probe may have the object moving toward it; or the probe may be moving and encountering a stationary object.

While this invention has been disclosed in its preferred embodiment, it will be apparent to those skilled in the art that changes may be made to the embodiment set forth while still employing the features of this invention to advantage. It will also be apparent that in some instances certain features of the invention may be used to advantage without corresponding use of other features. Accordingly, it is intended that the foregoing illustrative and descriptive materials have been used to illustrate the principles of the invention and not to limit the scope thereof.

What is claimed is:

1. In combination with a probe of the type having a housing, a stylus extending outwardly in an axial direction from the housing and having a position of equilibrium before any force external from the probe acts thereon, means for movably mounting said stylus to the housing to allow the stylus to displace to a first position from the equilibrium position, in response to a first force by an object on the stylus in any direction chosen from a radial and an axial direction toward the housing, a movable plate coupled to the stylus and carrying a conductor having spaced insulator regions along conductor, a set of contacts fixed to the housing and disposed to bridge and spaced insulator regions when the movable plate engages the contacts, and means for urging the plate toward the contacts fixed to the housing, the improvement comprising:

a stylus portion carried by the stylus and extending transversely to the axis of the stylus;

means for movably mounting the stylus to the housing to allow the stylus to displace from the equilibrium position in response to a second force by the object on the stylus portion directed axially away from the housing to a second position below said equilibrium position; and means responsive to said second force for generating an electrical signal which is a function of the displacement of the stylus as a result of said second force, said generating means including:

a second set of spaced insulator regions disposed on said conductor;

a second plate disposed within the housing and having a second set of contact fixed thereto and disposed to bridge the second set of spaced insulator regions when the stylus is in the equilibrium position; and a second means for urging the second plate toward the first plate with the contacts on the second plate in engagement with the second set of spaced insulator regions in the conductor, whereby the conductor has a low-resistance when the stylus is in its equilibrium position and said first and second sets of spaced contacts are seated on the spaced insulator regions and high resistance when the stylus is moved away from the equilibrium position and at least one of the contact is not seated in the corresponding spaced insulator region.

2. The probe of claim 1 wherein the conductor means comprises two concentric arcuate regions interconnected and the areas of high resistances extend radially and transect the two arcuate regions.

3. The probe of claim 2 wherein the arcuate regions are formed as printed circuit portions on a printed circuit board.

4. The probe of claim 1 wherein the housing is symmetrical about an axis and the electrical contacts in the first set are disposed at a selected radius from the housing axis with an equal arc between adjacent contacts in the first set.

5. The probe of claim 1 wherein the urging means includes a spring biasing the plate.

6. The probe of claim 5 wherein the first spring biases the first plate toward engagement with the first and second sets of electrical contacts in the areas of high resistance, and the second spring biases the second plate toward the first plate.

7. The probe of claim 1 wherein said conductor has arcuate conducting regions and said first and second insulating regions extend radially relative to said arcuate conducting regions and transect the regions.

8. The probe of claim 1 wherein said contacts are balls.

9. The probe of claim 8 wherein said balls are metallic.

10. The probe of claim 9 wherein said urging means are springs.

11. A probe for sensing the position of an object through the detecton of a force between the object and the probe, said probe, said probe comprising:

a housing;

a stylus extending from said housing in an axial direction and including a stylus portion extending transversely to the axial direction, said stylus and stylus portion adapted to be moved from a first position into another position upon engagement of the object with the stylus in a direction chosen from either axial direction and any radial direction with respect to the stylus;

means for movably mounting said stylus to said housing, said means including first and second biasing means for yieldably urging said stylus in first and second directions respectively, said first biasing means operating in a first direction which is opposed to the direction of the second biasing means, said mounting means and stylus adapted to displace, in response to the engagement of the object by the stylus in any direction chosen from either axial directin and any radial direction;

a member disposed within the housing and having a first set of low-resistance electrical contacts arranged in spaced relationship;

a second set of low-resistance electrical contacts arranged in spaced relationship on the housing;

an electrical conductor generally of low resistance disposed within the housing adjacent the sets of contacts and having areas of high resistance for selectively engaging first and second sets of electrical contacts at areas of high resistance, with said biasing means urging the conductor means toward said first and second sets of low-resistance electrical contacts with said first and second sets of low-resistance electrical contacts engaging the conductor means when the stylus is in the rest position and with at least a portion of said first and second sets of low-resistance contacts not engaging the conductor in areas of high-resistance when a force is detected by the stylus, thereby rendering the conductor high-resistance, and means for responding to the resistance of the conductor whereby the presence or absence of a force may be detected.

12. In combination with a probe of the type having a housing; a stylus extending outwardly in an axial direction from the housing and having a first position before any force external from the probe acts thereon; means for movably mounting said stylus to the housing to allow the stylus to displace in a first direction from the first position, in response to a force between an object and the stylus in any direction chosen from a radial and an axial direction toward the housing; means for sensing the displacement of the stylus in a first direction and for generating a signal indicative of such displacement; and means for biasing the stylus toward its first position; the improvement comprising:

a stylus portion carried by the stylus and extending transversely to the axis of the stylus;

means for movably mounting the stylus to the housing to allow the stylus to displace to a second position away from the first position in response to a force between the object and the stylus portion directed axially away from the housing; and means for sensing the displacement of the stylus in said second direction and a signal indicative of such force directed axially away from said housing whereby, when the stylus is in its first position, a force between the object and the stylus in any direction displaces the stylus and the displacement is sensed by the sensing means and a signal indicative of the displacement is generated by the generating means.

13. A probe of the type described in claim 12 wherein the means for sensing stylus displacement and for generating a signal includes means for generating an electrical signal indicative of stylus displacement.

14. A probe of the type described in claim 13 wherein the means for generating an electrical signal includes a plurality of complementary electrical circuit elements, with at least one of the circuit elements coupled to the stylus and at least one other circuit element coupled to the housing said complementary circuit elements positioned to form an electrical circuit having a first electrical characteristic when the stylus is in its first position and having a second characteristic when a second characteristic when a force between the stylus and the object displaces the stylus away from said.

15. A probe of the type described in claim 14 wherein the circuit characteristic is electrical resistance and the resistance is low when the stylus is in the first position and high when the stylus is moved from the first position in response to a force between the stylus and the object.

16. A probe comprising:
a housing;
a stylus extending outwardly in an axial direction from the housing and having a first position before any force external from the probe acts thereon;
means for movably mounting said stylus to the housing to allow the stylus to displace in a first direction from the first position, in response to a first force between an object and the stylus in any direction chosen from a radial and an axial direction toward the housing;
a stylus portion carried by the stylus and extending transversely to the axis of the stylus;
means for movably mounting the stylus to the housing to allow the stylus to displace in a second direction from the first position, in response to a second force between the object and the stylus portion directed axially away from the housing;
means for biasing the stylus toward its first position; and
means responsive to said displacement in one of said first and said second directions for generating a signal as an indication of a force between the object and the stylus in any direction, whereby, when no force external of the probe is applied to the stylus, the stylus is in the first position and no signal is generated and when a force acting in any direction is applied to the stylus, the stylus is displaced away from the first position in a direction chosen from said first and second directions and a signal from the generating means indicates the force and displacement.

17. A probe of the type described in claim 16 wherein said means for generating a signal includes means for generating an electrical signal indicative of stylus displacement.

18. A probe comprising:
a housing;
a stylus extending outwardly in an axial direction from the housing and having a first position before any force external from the probe acts thereon;
a stylus portion carried by the stylus and extending transversely to the axis of the stylus;
means for movably mounting said stylus to the housing to allow the stylus to displace in a first direction from the first position in response to a force between an object and the stylus, said first direction chosen from a radial and an axial direction toward the housing;
means for movably mounting the stylus to the housing to allow the stylus to displace in a second direction axially away from the housing and first position, stylus in response to a second force between the object and the stylus portion
means for biasing the stylus toward its first position; and
means responsive to said displacement in one of said first and said second directions for generating a signal as an indication of a force between the object and the stylus in any direction, whereby, when no force external of the probe is applied to the stylus, the stylus is in the first position and no signal is generated and when a force acting in any direction is applied to the stylus, the stylus is displaced away from the first position in one of said first and second directions and a signal from the generating means indicates the force and stylus displacement.

* * * * *

UNITED STATES PATENT AND TRADEMARK OFFICE
CERTIFICATE OF CORRECTION

PATENT NO.  :  B1 4,136,458

DATED       :  July 4, 1989

INVENTOR(S) :  Frederick K. BELL et al.

It is certified that error appears in the above-identified patent and that said Letters Patent is hereby corrected as shown below:

On the title page item [73], change "(The Bendix Corporation), Southfield, Mich." to --Renishaw plc, Gloucestershire, England--;

column 1, line 46, change "19-14" to --19-24--;
line 49, "probe of the type hav-" should not be in italics;
line 50, the entire line should not be in italics;
line 51, the entire line should not be in italics;
line 52, "fore any force external from the probe acts thereon;" should not be in italics;

column 2, line 41, change "element" to --elements--.

Signed and Sealed this

Twenty-sixth Day of March, 1991

Attest:

HARRY F. MANBECK, JR.

*Attesting Officer*　　　　*Commissioner of Patents and Trademarks*

REEXAMINATION CERTIFICATE (1089th)
United States Patent [19]
Bell et al.

[11] B1 4,136,458
[45] Certificate Issued    Jul. 4, 1989

[54] BI-AXIAL PROBE

[75] Inventors: Frederick K. Bell, Centerville; Jerome E. Deis, Kettering; Paul E. Allen, Springfield, all of Ohio

[73] Assignee: (The Bendix Corporation), Southfield, Mich.

Reexamination Request:
No. 90/001,525, Jun. 16, 1988

Reexamination Certificate for:
Patent No.: 4,136,458
Issued: Jan. 30, 1979
Appl. No.: 728,573
Filed: Oct. 1, 1976

[51] Int. Cl.⁴ ............................................. G01B 7/00
[52] U.S. Cl. ................................. 374/561; 33/143 L; 33/147 N; 33/148 H; 33/172 E
[58] Field of Search ............ 33/561, 560, 503, 143 L, 33/148 N, 172 E, 149 J, 23.11

[56] References Cited

U.S. PATENT DOCUMENTS

| | | |
|---|---|---|
| 2,470,244 | 5/1949 | Fryklund. |
| 3,016,619 | 1/1962 | Mueller. |
| 3,122,970 | 3/1964 | Rhoades. |
| 3,212,325 | 10/1965 | Katz et al. |
| 3,277,248 | 10/1966 | Melvin, Jr. |
| 3,520,063 | 7/1970 | Rethwish et al. |
| 3,541,924 | 11/1970 | Gambin. |
| 3,557,462 | 1/1971 | Kiewicz et al. |
| 3,670,420 | 6/1972 | Kiewicz et al. |
| 3,673,695 | 7/1972 | Rethwish. |
| 3,855,108 | 12/1974 | Bolz et al. |
| 3,855,708 | 12/1974 | Tann et al. |
| 3,869,799 | 3/1975 | Neuer et al. |
| 3,945,124 | 3/1976 | Jacoby et al. |
| 4,130,094 | 12/1978 | Amsbury. |
| 4,153,998 | 5/1979 | McMurtry. |
| 4,270,275 | 6/1981 | McMurtry. |
| 4,301,338 | 11/1981 | McMurtry. |
| 4,375,723 | 3/1983 | McMurtry. |

FOREIGN PATENT DOCUMENTS

| | | |
|---|---|---|
| 506115 | 9/1930 | Fed. Rep. of Germany. |
| 92567 | 9/1972 | Fed. Rep. of Germany. |
| 2346031 | 1/1975 | Fed. Rep. of Germany. |
| 872064 | 7/1961 | United Kingdom. |
| 1271841 | 4/1972 | United Kingdom. |
| 1348367 | 3/1974 | United Kingdom. |

OTHER PUBLICATIONS

"DEA Measuring Center Electronic Probe Options," DEA Brochure, publication date believed to be approximately Jul., 1975, p. 6.
D. W. Savage, "Multi-Directional Probe", Technical Digest No. 6, pp. 7–8, Apr. 1967.

*Primary Examiner*—William A. Cuchlinski, Jr.
*Assistant Examiner*—Thomas B. Will

[57] ABSTRACT

A probe for measuring coordinate positions on an object by sensing a displacement of the stylus which contacts the object. The probe is responsive to forces which result from the contact between the object and the stylus to indicate coordinate positions of the object. The probe includes a replaceable stylus having a shank portion defining an axis, with a transversely-extending portion extending from the shank portion for sensing forces exerted by objects in the axial direction away from the probe, while the stylus shank portion is responsive to forces in the radial and axial (toward the probe) directions. The probe is thus responsive to forces exerted on the stylus in any direction.

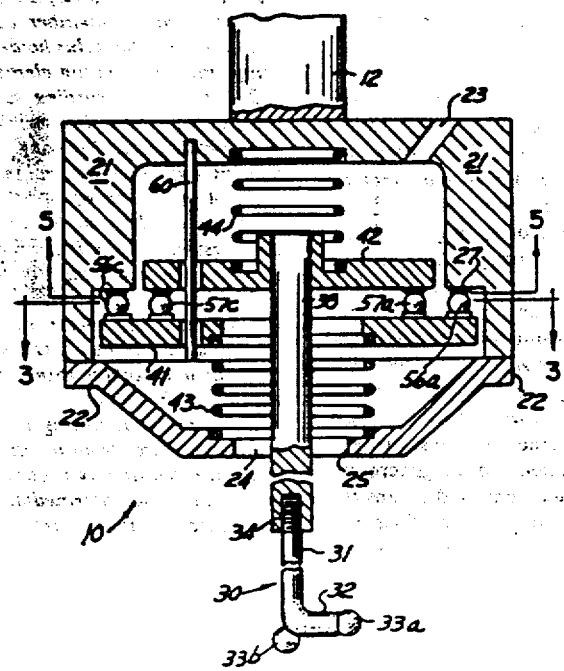

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 55–66:
In FIG. 3, the first plate *or intermediate member* 41 carries a printed circuit 51 defining a current path between two terminals 51a, 51b which terminals may be attached to a cable (not shown) in operation, with the cable in turn connected to an external sensing or triggering circuit (also not shown). Such a sensing circuit is responsive to the resistance of the printed circuit 51, and more particularly, to the change in resistance from a low level to a high level. As is shown in FIG. 3, the printed circuit 51 is preferably in the form of two concentric circular arc portions 51c, 51d with the respective ends opposite the cable connected together by a conductive portion 51e.

AS A RESULT OF REEXAMINATION, IT HAS BEEN DETERMINED THAT:

The patentability of claims 1–11 is confirmed.

Claims 16–18 are cancelled.

Claim 12 is determined to be patentable as amended.

Claims 13–15 dependent on an amended claim, are determined to be patentable.

New claims 19–14 are added and determined to be patentable.

12. [In combination with a] *A probe of the type having a housing; a stylus extending outwardly in an axial direction from the housing and having a first position before any force external from the probe acts thereon:* mounting means for mov[ab]ly mounting said stylus [to] *within* the housing [to] *to allow* the stylus to displace [in a first direction] from the first position[,] in response to a force between an object and the stylus in [any] *a* direction *having a component* chosen from a radial and an axial direction toward the housing *and any combination thereof,* [;] *and to allow the stylus to displace from the first position in response to a force between the object and the stylus portion directed axially away from the housing;* means for sensing the displacement of the stylus [in a] *from the* first [direction] *position* and for generating a signal indicative of such displacement; and means for biasing the stylus towards its first position; [the improvement comprising:] *wherein the improvement resides in that:* a stylus portion *is* carried by the stylus and [extending] *extends* transversely to the axis of the stylus; [means for movably mounting the stylus to the housing to allow the stylus to displace to a second position away from the first position in response to a force between the object and the stylus portion directed axially away from the housing; and means for sensing the displacement of the stylus in said second direction and a signal indicative of such force directed axially away from said housing whereby, when the stylus is in its first position, a force between the object and the stylus in any direction displaces the stylus and the displacement is sensed by the sensing means and a signal indicative of the displacement is generated by the generating means.] *the mounting means includes a stylus holder to which the stylus is connected, and an intermediate member;*

*the housing has first seating means thereon which face in a first sense along said axial direction, the intermediate member being urged into engagement with the first seating means by the bias means thereby to support the intermediate member in a rest position on the housing when no external force acts on the stylus;*

*the intermediate member has second seating means thereon which face in the opposite sense along said axial direction to the first seating means, the stylus holder being urged into engagement with the second seating means by the bias means thereby to support the stylus holder in a rest position on the intermediate member when no external force acts on the stylus;*

*one of the stylus holder and the intermediate member is separable from its associated seating means when a force having a component in the direction axially toward the housing is applied to the stylus; and*

*the other one of the stylus holder and the intermediate member is separable from its associated seating means when a force directed axially away from the housing is applied to the stylus.*

*19. A probe according to claim 12, wherein the first seating means comprises a plurality of seating element on the housing equispaced around said axial direction, and the intermediate member is provided with confronting complementary seating elements.*

*20. A probe according to claim 12, wherein the second seating means comprises a plurality of seating elements on the intermediate member equispaced around said axial direction, and the stylus holder is provided with confronting complementary seating elements.*

*21. A probe according to claim 12, wherein the bias means comprises a first spring between the housing and the intermediate member, and a second spring between the housing and the stylus holder.*

*22. A probe according to claim 12, wherein said one of the stylus holder and the intermediate member is tiltable on its associated seating means when a force in a direction transverse to said axial direction is applied to the stylus.*

*23. A probe according to claim 22, wherein said other one of the stylus holder and the intermediate member is additionally tiltable on its associated seating means when a force in a direction transverse to said axial direction is applied to the stylus.*

*24. A probe according to claim 12, wherein said stylus holder separates from its associated seating means when a force directed axially toward the housing is applied to said stylus and said intermediate member separates from its associated seating means when a force directed axially away from said housing is applied to said stylus.*

* * * * *